United States Patent [19]

Inoue

[11] Patent Number: 5,436,441
[45] Date of Patent: Jul. 25, 1995

[54] NONCONTACTING CARD, NONCONTACTING-CARD TERMINAL AND NONCONTACTING TRANSMISSION SYSTEM

[75] Inventor: Takesi Inoue, Itami, Japan

[73] Assignee: Mitsubishi Denki Kabushiki Kaisha, Tokyo, Japan

[21] Appl. No.: 964,262

[22] Filed: Oct. 21, 1992

[30] Foreign Application Priority Data

Nov. 7, 1991 [JP] Japan .................. 3-291462

[51] Int. Cl.$^6$ ......................... G06K 19/07
[52] U.S. Cl. .................. 235/487; 235/492; 235/493
[58] Field of Search ........... 235/449, 492, 493, 450, 235/487; 336/137, 147, 170, 180, 232, 200; 340/572

[56] References Cited

U.S. PATENT DOCUMENTS

| | | | |
|---|---|---|---|
| 2,843,829 | 7/1958 | Slate | 336/200 |
| 3,845,437 | 10/1974 | Goodman | 336/147 |
| 4,678,986 | 7/1987 | Barthelemy | 336/147 |
| 4,761,628 | 8/1988 | Nishi et al. | 336/232 |
| 4,791,283 | 12/1988 | Burkhardt | 235/492 |
| 4,791,285 | 12/1988 | Ohki | 235/449 |
| 4,818,853 | 4/1989 | Ohta et al. | 235/492 |
| 4,818,855 | 4/1989 | Mongeon et al. | 235/440 |
| 4,899,036 | 2/1990 | McCrindle et al. | 235/380 |
| 4,960,983 | 10/1990 | Inoue | 235/449 |
| 5,198,647 | 3/1993 | Mizuta | 235/449 |

FOREIGN PATENT DOCUMENTS

| | | | |
|---|---|---|---|
| 61-51286 | 3/1986 | Japan | 235/487 |
| 62-134780 | 6/1987 | Japan | 235/487 |
| 63-57295 | 3/1988 | Japan | . |
| 1150305 | 6/1989 | Japan | . |
| 4137606 | 5/1992 | Japan | . |

*Primary Examiner*—John Shepperd
*Attorney, Agent, or Firm*—Leydig, Voit & Mayer

[57] ABSTRACT

A noncontacting card containing a coil circuit has at least two spiral windings connected in parallel for electromagnetically coupling the card to a terminal and a processing circuit connected to the coil circuit for signal processing. A terminal for a noncontacting card including a coil circuit has at least two spiral windings connected in parallel for electromagnetically coupling the terminal to a noncontacting card and a processing circuit connected to the coil circuit for signal processing. A noncontacting transmission system includes a noncontacting card having a coil circuit including at least two spiral windings connected in parallel and a terminal having a coil circuit including at least two spiral winding connected in parallel, the coil circuits of the noncontacting card and the terminal being electromagnetically coupled for transmitting electrical power to the noncontacting card and exchanging data between the terminal and the noncontacting card.

2 Claims, 9 Drawing Sheets

NONCONTACTING CARD, NONCONTACTING-CARD TERMINAL AND NONCONTACTING TRANSMISSION SYSTEM

BACKGROUND OF THE INVENTION

1. Field of the Invention

The present invention relates to a noncontacting card which transfers electric power and signals by electromagnetic coupling, a terminal for it, and furthermore noncontacting transmission systems.

2. Description of the Related Art

FIG. 17 shows an example of a conventional noncontacting card, which is disclosed in U.S. Pat. No. 4,791,285. This noncontacting card 1 contains an electric circuit 3 and four coils 4 to 7 connected to this electric circuit 3. The coil 4 is used for receiving electric power from a terminal not shown in this figure. The coil 5 is used for transmitting data to a terminal. The coil 6 is used for receiving data from a terminal and the coil 7 is used for receiving a mode setting signal from a terminal. Taking the coil 4 as an example, details are shown in FIG. 18. The coil 4 has a spiral shape with a single wire on a printed circuit board 2. An end of the coil 4 is connected to the circuit 3 via a wire on a surface of the printed circuit board 2, and the other end is connected to the circuit 3 via a wire on the back surface of the printed circuit board. 2.

A coil holder of a terminal is shown in FIG. 19. This coil holder 8 has an upper board 9, a vertical board 12, and a lower board 13, and has a U-like shape. Spiral coils 11a and 11b are located on the upper board 9 and the lower board 13 respectively. One end of each of spiral coils 11a and 11b is connected to electrodes 10 and 14, respectively. These spiral coils 11a and 11b are also connected to each other in series via a wire on the vertical board 12. Only a pair of coils are shown in FIG. 19, but the coil holder 8 has four pairs of coils corresponding to each of the coils 4 to 7 on the noncontacting card 1.

The operation of the coils 11a and 11b shown in FIG. 19 is explained next, assuming that these coils are used for transmitting electric power, i.e. correspond to the coil 4 on the noncontacting card 1. When a noncontacting card 1 is inserted into the coil holder 8 so that the center axis of the coil 4 on the noncontacting card 1 coincides with the center axes of the coils 11a and 11b of the coil holder 8, and furthermore AC current is supplied from a terminal via electrodes 10 and 14, an AC voltage is induced at the coil 4 on the noncontacting card 1 by the electromagnetic coupling. In this case, because coils 11a and 11b of a coil holder 8 are connected in series so that both coils generate magnetic flux in the same direction, the generated AC electromagnetic force is twice as strong as if just one coil, either 11a or 11b, is used.

However, transmission efficiency is low, because conventional noncontacting cards transmit electric power and data with a single wire spiral coil. As a result of this, a terminal cannot transmit strong enough electric power. Moreover, when a large gap exists between coils of a noncontacting card and a terminal, accurate transmission is impossible and a noncontacting card does not function well.

When, as shown in FIG. 19, two coils connected in series are used to improve transmission efficiency, the electric resistance and inductance of the coils become large due to the wiring length of coils. Therefore, the power loss becomes large bringing about difficulties in transmission of electric power and data using high frequency carriers such as higher than 1 MHz.

SUMMARY OF THE INVENTION

It is an object of the present invention to solve the problems described above. More specifically, it is an object of the present invention to provide a noncontacting card for high efficiency transmission of electric power from and data/to a terminal.

It is another object of the present invention to provide a terminal for a noncontacting card for high efficiency transmission of electric power to and data from a noncontacting card.

It is a further object of the present invention to provide a high transmission efficiency noncontacting transmission system.

A noncontacting card according to the present invention comprises a coil circuit having at least two spiral coils connected to each other in parallel and electromagnetically coupled with a terminal and a processing circuit connected to the coil circuit for signal processing.

A terminal for a noncontacting card according to the present invention comprises a coil circuit having at least two spiral coils connected to each other in parallel and electromagnetically coupled with a noncontacting card and a processing circuit connected to the above coil circuit for signal processing.

A noncontacting transmission system according to the present invention comprises a noncontacting card having a coil circuit containing at least two spiral coils connected to each other in parallel and a terminal having a coil circuit including least two circuits of spiral coils connected to each other in parallel wherein the coil circuits of the noncontacting card and the terminal are electromagnetically coupled with each other so that the terminal can transmit electric power to the noncontacting card and so that transmission of data between the terminal and the noncontacting card is achieved.

DESCRIPTION OF THE PREFERRED EMBODIMENTS

Referring to figures, embodiments of the present invention are described below.

Figure 1:
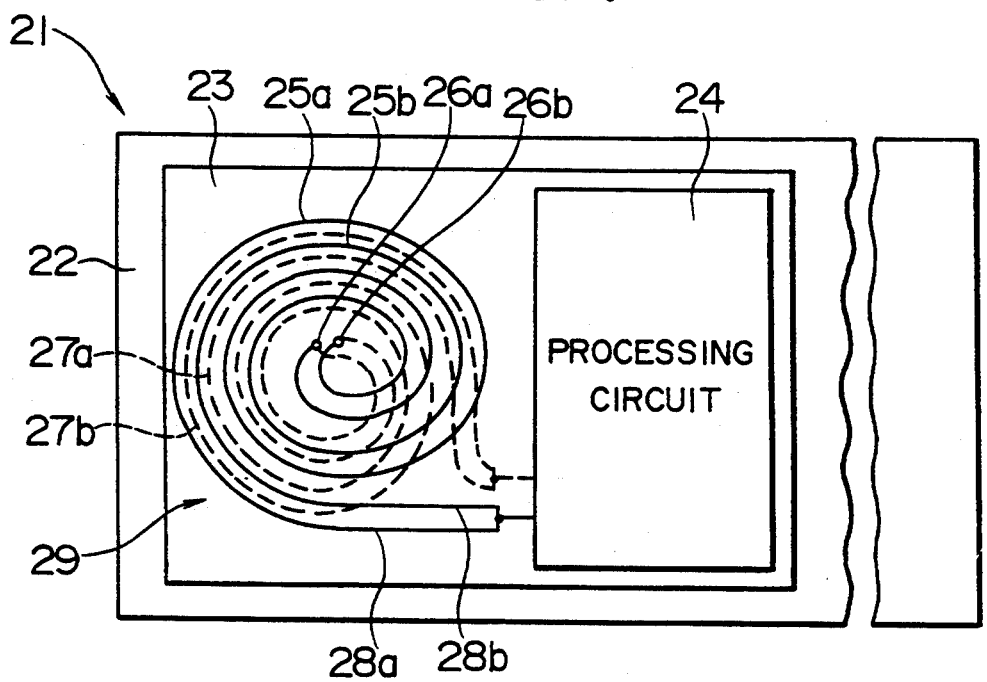
FIG. 1 is a perspective plan view of a noncontacting card of an embodiment of the present invention.

As shown in FIG. 1, a noncontacting card 21 according to an embodiment of the present invention has a printed circuit board 23 sealed in a package 22 made of such as plastic. Located on a surface of the printed circuit board 23, are a processing circuit 24 for signal processing and first double spiral coil wires 25a and 25b. Ends of these spiral coil wires 25a and 25b are connected to each other, and to a processing circuit 24. The other ends are connected to through-holes 26a and 26b, respectively, through a printed circuit board 23. Located on the back surface, are second double spiral coil wires 27a and 27b. Ends of these spiral coil wires 27a and 27b are connected to each other and to the processing circuit 24. The other ends are connected to through-holes 26a and 26b respectively. That is, the first spiral coil wires 25a and 25b are connected to the second spiral coil wires 27a and 27b respectively via through-holes 26a and 26b so that two spiral coil circuits are connected to each other in parallel.

Figure 2:
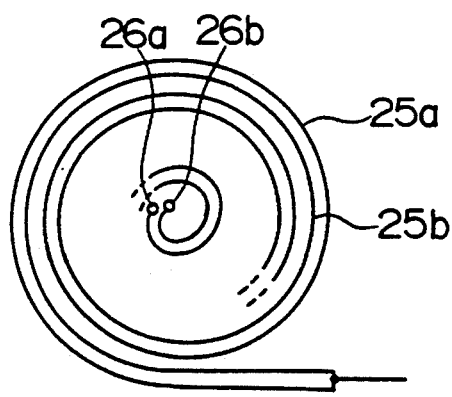
FIG. 2 is a plan view of a first spiral coil wire of FIG. 1.
Figure 3:
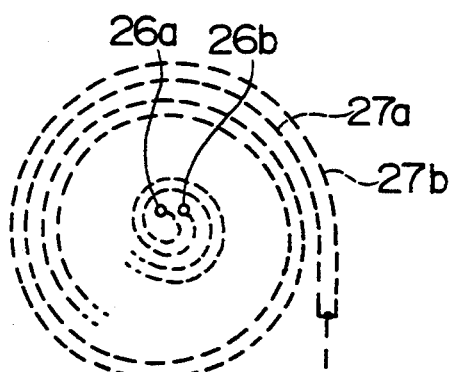
FIG. 3 is a plan view of a second spiral coil wire of FIG. 1.
Figure 4:
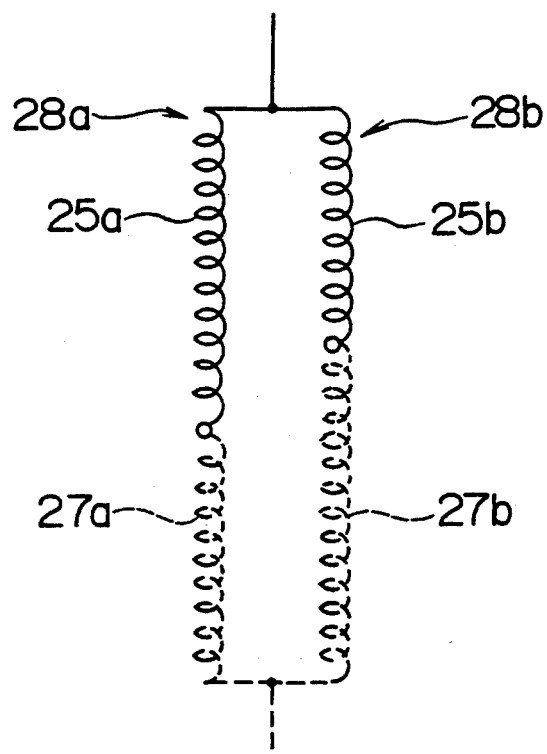
FIG. 4 is a diagram showing an equivalent circuit of a coil circuit of FIG. 1.

On the surface of the printed circuit board 23, as shown in FIG. 2, spiral coils are wound so that wire 25a forms an outer winding and wire 25b forms an inner winding. In contrast, on the back surface of the printed circuit board 23, as shown in FIG. 3, spiral coils are wound so that wire 27a forms an inner winding and 27b forms an outer winding. As a result, both spiral coil circuits 28a and 28b have the same total wiring length which is the sum of the first spiral coil wire length and the second spiral coil wire length. Therefore, as shown in an equivalent circuit of FIG. 4, the resistance and inductance of the spiral circuit 28a are the same as the resistance and inducatance of the spiral circuit 28b respectively.

Spiral coil circuits 28a and 28b are connected to each other in parallel in such a manner described above as a coil circuit 29. This coil circuit 29 functions as a coil for receiving electric power from a terminal not shown in the figure as well as a coil for transmitting to and receiving data signal from a terminal. The through-holes 26a and 26b are part of a connection means. These spiral coil wires 25a, 25b, 27a, and 27b are made of copper foil disposed on the surfaces of the printed circuit board 23 and etched into a spiral shape.

In a noncontacting card according to this embodiment of the present invention high efficiency transmission of electric power from and date to a terminal by electromagnetic coupling with a coil in a terminal is achieved because the coil circuit 29 includes two spiral coil circuits 28a and 28b connected to each other in parallel. Especially, the resistance and an inductance of the coil circuit 29 are small because spiral coil circuits 28a and 28b are connected to each other in parallel. As a result, the power loss is reduced and transmission using a high frequency carrier, such as higher than 1 MHz, is possible. Furthermore, equality in resistances and inductances between two spiral coil circuits 28a and 28b leads to a good balance in electromagnetic coupling with a terminal.

Figure 5:
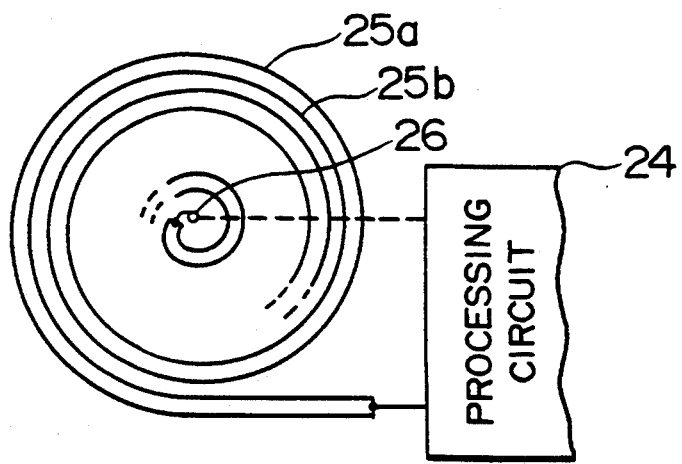
FIG. 5 is a plan view of a major part of a noncontacting card of another embodiment of the present invention.
Figure 6:
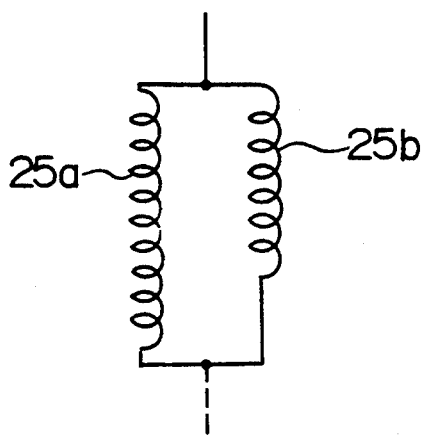
FIG. 6 is a diagram showing an equivalent circuit of a coil circuit of FIG. 5.

This invention is not limited to the foregoing embodiment. Both of the double spiral coil wires 25a and 25b can be located on only one surface of a printed circuit board 23, as shown in FIG. 5. Ends of spiral coil wires 25a and 25b are connected to each other and further connected to a processing circuit 24, and the other ends are connected to each other and further connected, via a through-hole 26, to a wire on a back surface leading to a processing circuit 24. In this case, because two spiral coil wires 25a and 25b are connected to each other in parallel, have different lengths, these two spiral coil circuits are different in resistances and inductances. However, high efficiency transmission to and from a terminal can be achieved.

Figure 7:
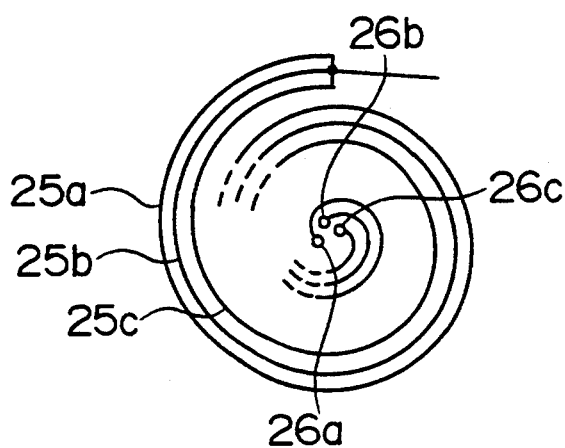
FIG. 7 is a plan view of a first spiral coil wire of another embodiment of the present invention.
Figure 8:
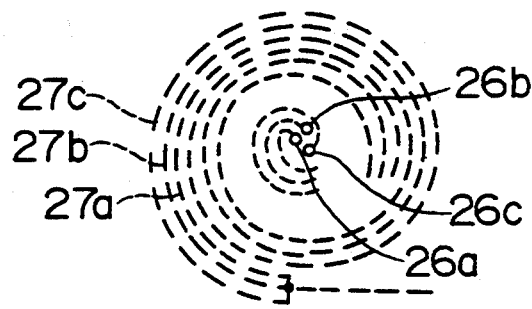
FIG. 8 is a plan view of a second spiral coil wire of an embodiment of FIG. 7.
Figure 9:
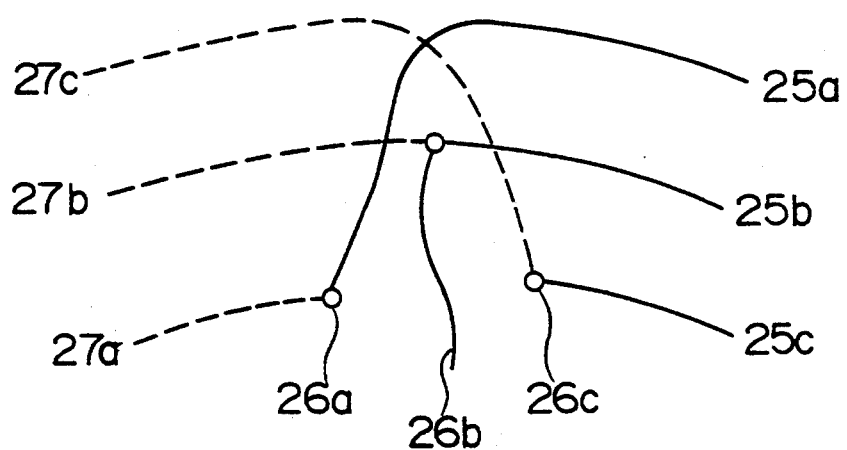
FIG. 9 is a plan view showing a connections between first and second spiral coil wires of the embodiment of FIG. 7.
Figure 10:
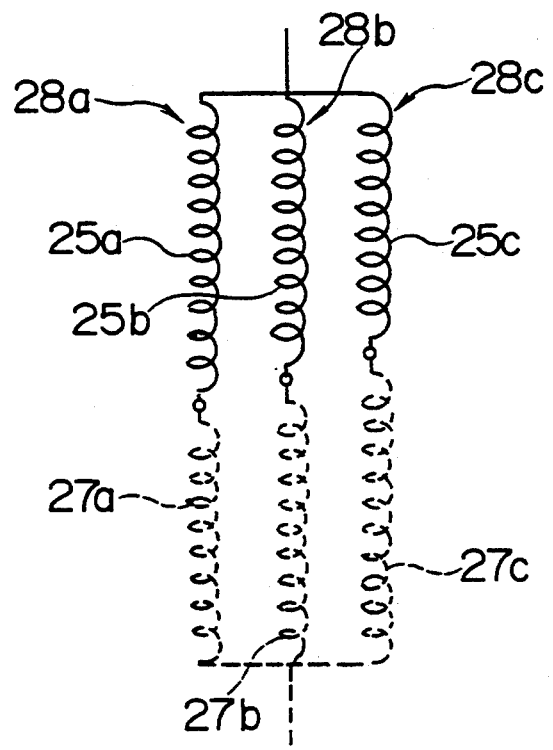
FIG. 10 is a diagram showing an equivalent circuit of a coil circuit of the embodiment of FIG. 7.

Moreover, the number of spiral coil wires connected in parallel is not limited to two. For example, it is possible to form first triple spiral coil wires 25a to 25c on a surface of a printed circuit board 23 as shown in FIG. 7, and form second triple spiral coil wires 27a to 27c on the back surface of the printed circuit board 23 as shown in FIG. 8, and connect, as shown in FIG. 9, spiral coil wires to corresponding spiral coils wires via throughholes 26a to 26c. If the first spiral coil wires have their windings placed in the order of 25a, 25b, and 25c in the direction from the outside to the inside, then, the second spiral coil wires have their windings placed in the order of 27c, 27b, and 27c in the direction from the outside to the inside. Thus, spiral coil circuits 28a, 28b, and 28c, composed of first and corresponding second spiral wires connected to each other, can be equal in length. Therefore, as shown in an equivalent circuit of FIG. 10, spiral coil circuits 28a, 28b, and 28c are equal in resistance and inductance. In this way, more efficient transmission to and from a terminal can be achieved by increasing the number of spiral coil circuits connected in parallel.

Figure 11:
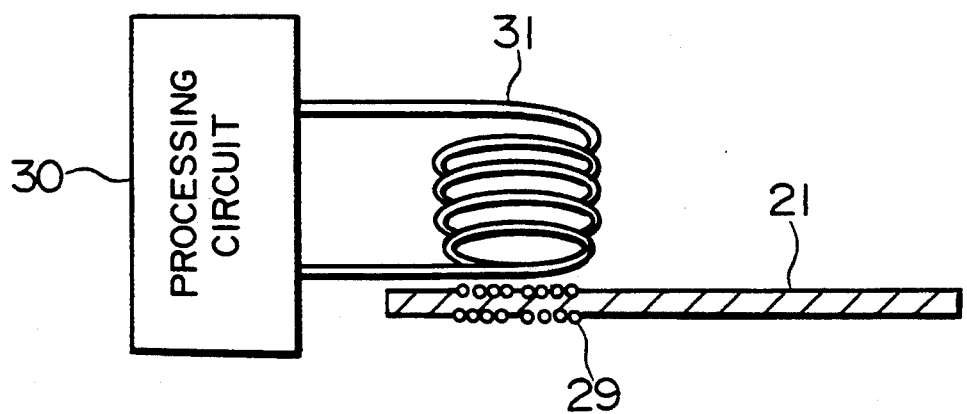
FIG. 11 is a schematic diagram of a noncontacting transmission system of an embodiment of the present invention.
Figure 12:
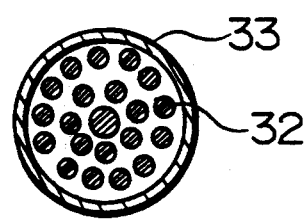
FIG. 12 is a cross sectional view of a stranded wire used in a system of FIG. 11.

FIG. 11 is a schematic diagram of a noncontacting transmission system for the noncontacting transmission of electric power and data signal, which has a terminal combined with a noncontacting card 21. A terminal has a processing circuit 30 for signal processing based on a preset processing sequence. This processing circuit 30 is connected to a spiral coil circuit 31 for electromagnetic coupling with a coil 29 of a noncontacting card 21. As shown in FIG. 12, the coil circuit 31 is made of a stranded wire 33 comprising a plurality of bundled conducting wires 32. The individual conducting wires of the stranded wire 33 are electrically insulated from each other.

Figure 13:
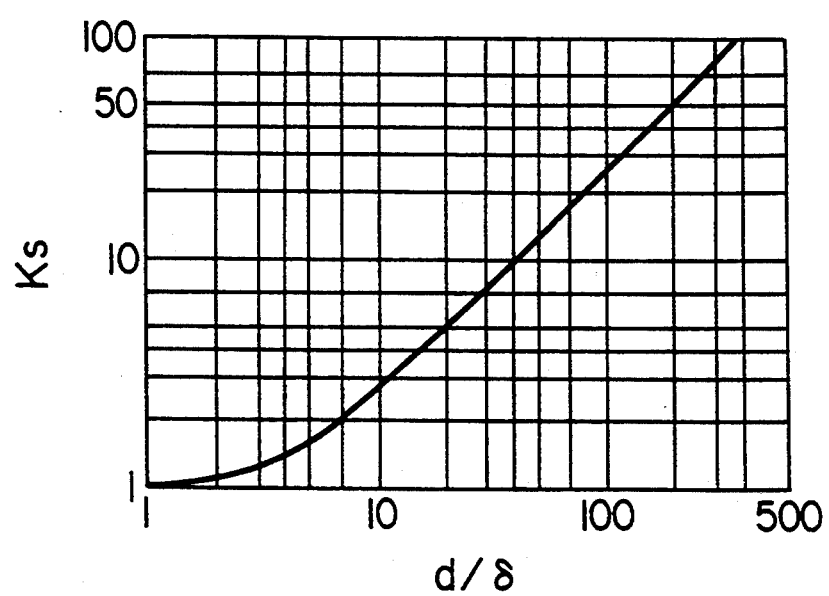
FIG. 13 is a graph showing a relationship between the rate of increase in AC resistance and the ratio of the diameter of a conductor skin depth.

In general, when AC current flows in a conductor, it is known that the increase rate of AC resistance due to the skin effect can be described by $Ks = d^2/4(d-\delta)\delta$ where $d$ (mm) is the diameter of the conductor and $\delta$ (mm) is the skin depth of the conductor in which a current flows. Using this equation, the increase in AC resistance Ks can be described as a function of the ratio of conductor diameter to skin depth, d/δ, as shown in FIG. 13. As can be seen from this figure, larger diameters of a conductor or smaller skin depths lead to larger AC resistances.

Figure 14:
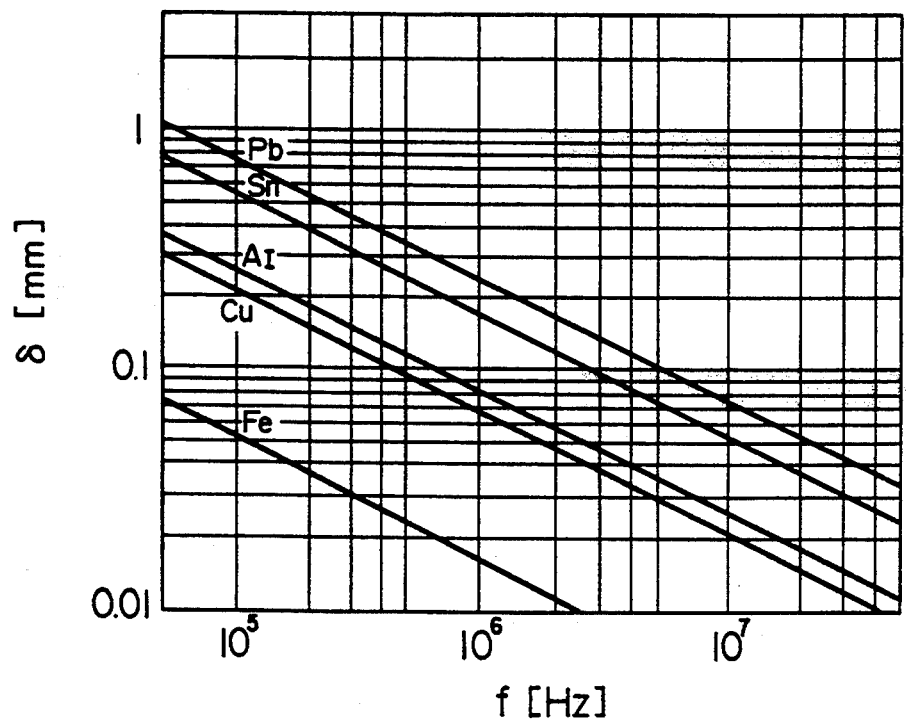
FIG. 14 is a graph showing the dependence of skin depth on frequency.

When the resistivity of a conductor, the frequency of AC current, vacuum permeability, and relative permeability of a conductor are expressed by $\rho$ (Ωcm), f (Hz), $\mu_0 = 4\pi \times 10^{-7}$ (H/m), and $\mu_r$, respectively, the skin depth δ is described by $\delta = (\rho/2f\mu_0\mu_r)^{\frac{1}{2}}/10$. In this formula, resistivity $\rho$, vacuum permeability $\mu_0$, and relative permeability of conductor $\mu_r$, are constants which depend on conductor material, and only the frequency f of AC current is a variable. The skin depth δ is plotted as a function of frequency f for various kinds of conductors in FIG. 14. As can be seen from this figure, skin depth δ decreases as frequency increases. That is, current can flow only in the layer near the surface of a conductor at high frequencies, Therefore, for transmission of electric power at high frequencies via a conductor, a stranded wire comprising a plurality of bundled fine conducting wires can transmit electric power more efficiently due to its low AC resistance than a single wire having a cross sectional area equivalent to the total cross sectional area of the stranded wire.

After a noncontacting card 21 is inserted into a terminal at a proper position so that the center axis of a coil circuit 31 in a terminal coincides with the center axis of coil circuit 29 on the noncontacting card 21 as shown in FIG. 11, a processing circuit 30 of the terminal supplies AC current to the coil circuit 31. Then electromagnetic induction induces an AC voltage in the coil circuit 29 of the noncontacting card 21, thus the noncontacting card 21 is turned on. After that, based on a preset processing sequence and using the coil circuit 31, the processing circuit 30 transmits data to or receives data from the noncontacting card 21.

Figure 15:
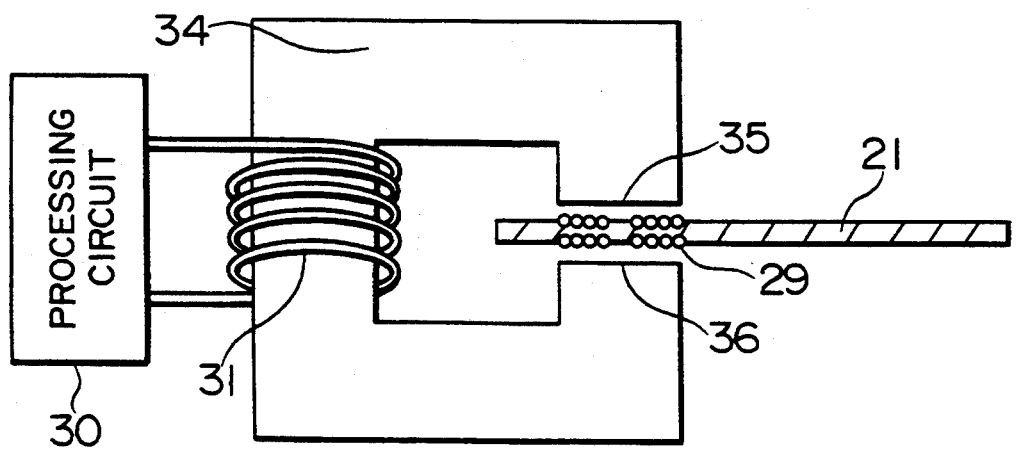
FIG. 15 is a schematic diagram of a noncontacting transmission system of another embodiment of the present invention.

As shown in FIG. 15, a coil circuit 31 of a terminal can comprise a wire wound around a ferrite core 34 which has a pair of end surfaces 35 and 36 facing each other. A coil circuit 29 of a noncontacting card 21 is inserted into the space between these end surfaces 35 and 36. Because the ferrite core 34 has good electrical characteristics—it has higher permeability and less magnetic reluctance than air—, effective electromagnetic coupling can be achieved between a coil circuit 31 of a terminal and a coil circuit 29 of a noncontacting card 21. As for the gap between the end surfaces 35 and 36 of a ferrite core 34, a narrower gap is more desirable to get effective results.

Figure 16:
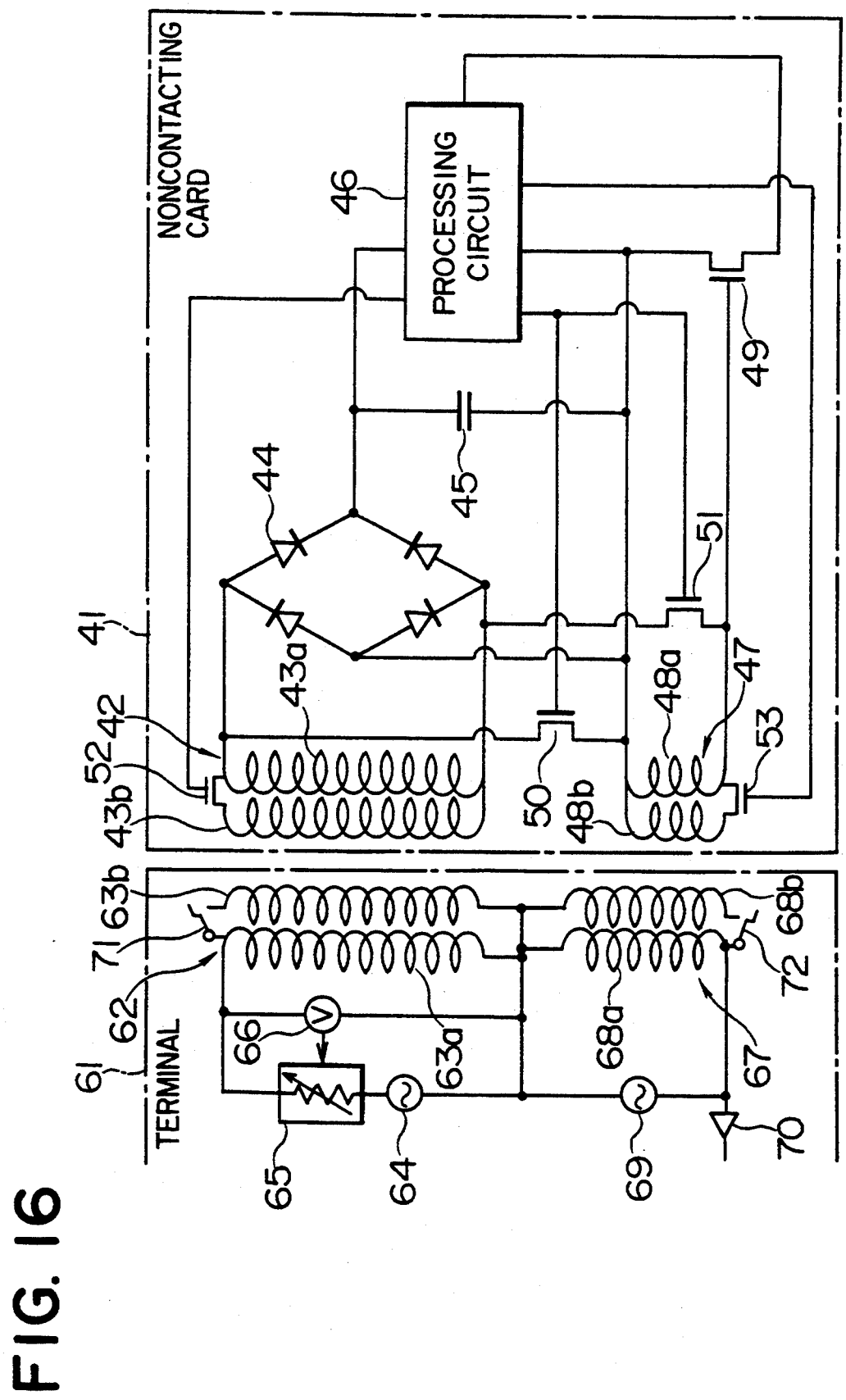
FIG. 16 is a circuit diagram of a noncontacting transmission system of still another embodiment of the present invention.
Figure 17:
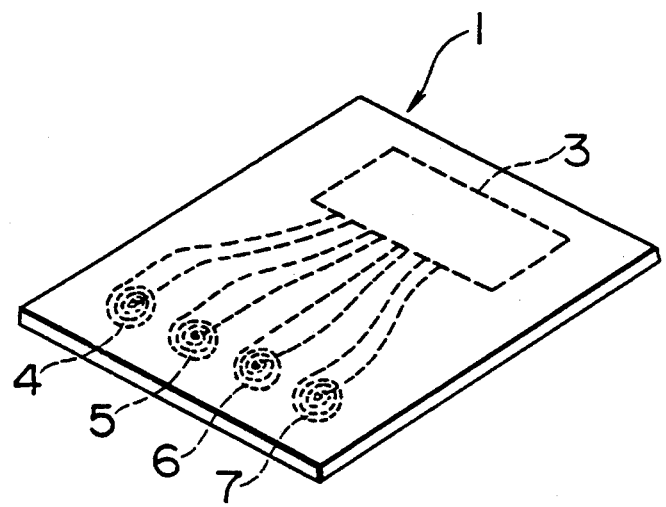
FIG. 17 is a perspective view of a conventional noncontacting card.
Figure 18:
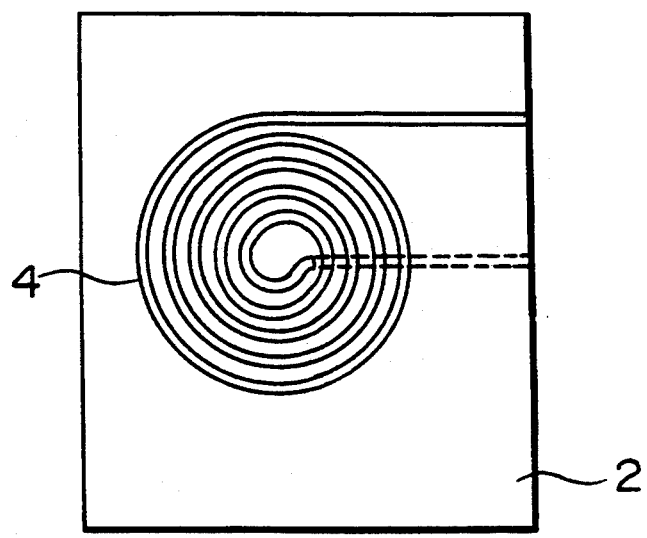
FIG. 18 is a plan view of a noncontacting card of FIG. 17.
Figure 19:
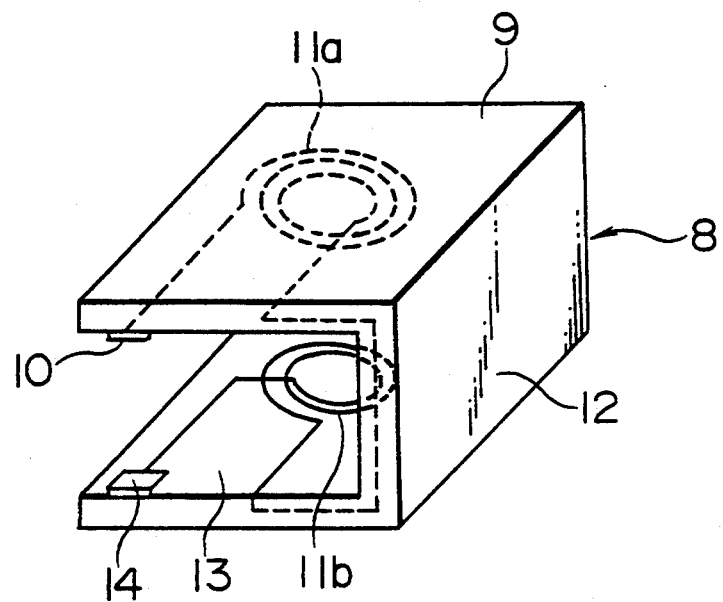
FIG. 19 is a perspective view of a major part of a conventional terminal for a noncontacting card.

FIG. 16 shows a noncontacting transmission system composed of a combination of a noncontacting card 41 and a terminal 61. The noncontacting card 41 has a coil circuit 42 for receiving AC electric power, connected to a rectifier circuit 44 for rectifying the AC power. The rectifier circuit 44 is connected to a smoothing capacitor 45 for smoothing a pulsating wave and further connected to a processing circuit 46. Moreover, the noncontacting card 41 has a coil circuit 47 for transmitting or receiving data signals. This coil circuit 47 is connected to the processing circuit 46 via a transistor 49. Between the coil circuit 42 and coil circuit 47, transistors 50 and 51 are provided to supply AC power induced at the coil circuit 42 to the coil circuit 47.

The coil circuit 42 has two spiral coils 43a and 43b connected to each other via a transistor 52. Similarly, the coil circuit 47 has two spiral coils 48a and 48b connected to each other via a transistor 53. The transistors 52 and 53 work as a selection means. Gates of both of these transistors are connected to the processing circuit 46. When, for example, the transistor 52 turns on, spiral coils 43a and 43b are connected in parallel and the coil circuit 42 functions as a spiral coil including of two coils in parallel. When the transistor 52 turns off, spiral coils 43a and 43b are disconnected and the coil circuit 42 functions as a spiral coil consisting of just one coil 43a. The transistor 53 also operates in a similar way.

The terminal 61 has a coil circuit 62 for transmitting electric power which is connected to a AC generator 64, an attenuator 65, and an output voltage detector circuit 66. The terminal 61 also has a coil circuit 67 for transmitting and receiving data signals which is connected to an oscillator 69 for transmitting data signals. The coil circuit 67 is, furthermore, connected to a waveform shaping circuit 70. The coil circuit 62 has two spiral coils 63a and 63b connected to each other via a switching circuit 71. The coil circuit, 67 has two spiral coils 68a and 68b connected to each other via a switching circuit 72. The switching circuits 71 and 72 work as a selection means. When the switching circuit 71 is closed, spiral coils 63a and 63b are connected in series and the coil circuit 62 functions as a spiral coil including two coils connected in parallel. On the other hand, when the switching circuit 71 is open, spiral coils 63a and 63b are cut off and the coil circuit 62 functions as a spiral coil with just one coil 63a. The switching circuit 72 also operates in a similar way.

This noncontacting transmission system operates as follows. In the following description, it is assumed that both transistors 52 and 53 of a noncontacting card 42 are on and both switching circuits 71 and 72 of the terminal 61 are closed. First, a noncontacting card 41 is inserted into a terminal 61 and the coil circuit 42 of the noncontacting card 41 is placed near the coil circuit 62 of the terminal 61. Then, the AC generator 64 of the terminal 61 generates an AC voltage. The output voltage detector circuit 66 detects the voltage across the coil circuit 62, and the detected voltage is fed back to the attenuator 65 so that the detected voltage is equal to a predetermined value. Thus, the power supply to the noncontacting card 41 is maintained constant. When a voltage is applied to the coil circuit 62 as described above, an AC voltage is induced at the coil circuit 42 of the noncontacting card 41 by electromagnetic induction. This induced AC voltage is converted into a pulsating flow by the rectifier circuit 44 and furthermore smoothed with a capacitor 45. Then this smoothed voltage is supplied to the processing circuit 46 so that the noncontacting card 41 is turned on.

After that, signals are transmitted from the oscillator 69 of the terminal 61 via the coil circuit 67 and the coil circuit 47 of the noncontacting card 41 receives those signals by the electromagnetic induction. These received signals make the transistor 49 turn on and the signals are transmitted to the processing circuit 46. On the other hand, when the noncontacting card 41 transmits signals to the terminal 61, signals from the processing circuit 46 make transistors 50 and 51 turn on, and AC power is supplied to the coil circuit 47 for transmitting and receiving signals from the coil circuit 42 and signals are transmitted to the coil circuit 67 of the terminal 61.

When the noncontacting card 41 dissipates only a little electric power, the voltage detected by the output voltage detector circuit 66 of the terminal 61 rises due to the reduction in a load. In this case, instead of attenuating the oscillated AC voltage with the attenuator 65, it is also possible to control the supply power by opening the switching circuit 71 to make the coil circuit 62 act as a spiral coil of just one coil 63a. Similarly, as for the coil circuit 67 for transmitting and receiving signals, when the received signal voltage is high, the received signal voltage can be controlled by opening the switching circuit 72.

On the other hand, when the noncontacting card 41 does not have heavy electrical load, or when it is required to reduce the power supply during the noncontacting card 41 is idle, the signal from the processing circuit 46 makes the transistor 52 turn off so that the coil circuit 42 acts as a spiral coil of just one coil 43a. As for the coil circuit 47 for transmitting and receiving signals, the reception/transmission signal level can be optimized by switching the transistor 53. In this case, however, it is more effective to take the best combination of open/closed state of the switching circuit 72 of the terminal 61 and on/off state of the transistor 53 of the noncontacting card 41 to optimize the signal level.

In FIG. 16, each of the coils 42 and 47 of the noncontacting card 41 and the coils 62 and 67 of the terminal 81 includes two circuits of spiral coils in parallel. However, this invention is not so limited. These coils include three spiral coils or more than that connected in parallel to achieve more effective transmission.

Moreover, a winding made of stranded wire, such a wire shown in FIG. 12, formed on a printed circuit board can be used for coils of a noncontacting card. Furthermore, a coil made of etched copper foil can be used for coils of a terminal.

What is claimed is:

1. A noncontacting card comprising:

a printed circuit board;

a plurality of spiral windings having respective centers and disposed on opposite sides of said printed circuit board with the centers of two of said spiral windings on opposite sides of said printed circuit board directly opposite each other, spiral windings on opposite sides of said printed circuit board being connected in series as respective coil circuits for electromagnetically coupling the noncontacting card with a terminal;

selection means for selecting a desired number of said coil circuits from among said plurality of coil circuits and connecting the selected coil circuits in parallel; and a processing circuit connected to said selected coil circuits for signal processing.

2. The noncontacting card as defined in claim 1 wherein said selection means comprises a switch.

* * * * *